(12) United States Patent
An et al.

(10) Patent No.: US 9,371,023 B2
(45) Date of Patent: Jun. 21, 2016

(54) APPARATUS FOR OPENING AND CLOSING SLIDING ARMREST CONSOLE

(71) Applicants: Hyundai Motor Company, Seoul (KR); NIFCO KOREA Inc., Asan-si, Chungcheongnam-do (KR); Dongkook Ind. Co., Ltd, Asan-si, Chungcheongnam-do (KR)

(72) Inventors: Jae Hyun An, Seosan-si (KR); Tae Su Jang, Cheonan-si (KR); In Chan Jeong, Ulsan (KR)

(73) Assignees: Hyundai Motor Company, Seoul (KR); NIFCO KOREA Inc., Asan-si (KR); Dongkook Ind. Co., Ltd, Asan-si (KR)

( * ) Notice: Subject to any disclaimer, the term of this patent is extended or adjusted under 35 U.S.C. 154(b) by 0 days.

(21) Appl. No.: 14/535,696

(22) Filed: Nov. 7, 2014

(65) Prior Publication Data
US 2016/0001684 A1    Jan. 7, 2016

(30) Foreign Application Priority Data
Jul. 2, 2014    (KR) .................. 10-2014-0082438

(51) Int. Cl.
*B60N 2/46*    (2006.01)
(52) U.S. Cl.
CPC ............ *B60N 2/4686* (2013.01); *B60N 2/4626* (2013.01); *B60N 2/4646* (2013.01)
(58) Field of Classification Search
CPC ...... B60N 2/46; B60N 2/4626; B60N 2/4646; B60N 2/4686; B60R 7/04
USPC ........................ 296/24.34, 37.8; 220/811, 812
See application file for complete search history.

(56) References Cited

U.S. PATENT DOCUMENTS

| 9,156,386 | B2 * | 10/2015 | Cinco | ................. B60N 2/4646 |
| 2010/0156129 | A1 * | 6/2010 | Evans | ...................... B60R 7/04 |
| | | | | 296/24.34 |
| 2011/0227359 | A1 | 9/2011 | Fesenmyer | |

FOREIGN PATENT DOCUMENTS

| DE | 102013103158 A1 * | 10/2014 | .......... B60N 2/4646 |
| JP | 6-99775 A | 4/1994 | |
| JP | 2009-62004 A | 3/2009 | |
| KR | 10-2005-0058574 A | 6/2005 | |
| KR | 10-2005-0120112 A | 12/2005 | |
| KR | 10-1500271 B1 | 3/2015 | |

OTHER PUBLICATIONS

English translation of KR 10-1500271; retreived Oct. 21, 2015 from the Korean Intellectual Property Rights Information Service; http://eng.kipris.or.kr/enghome/main.jsp.*

* cited by examiner

*Primary Examiner* — Jason S Daniels
(74) *Attorney, Agent, or Firm* — Morgan, Lewis & Bockius LLP

(57) ABSTRACT

An apparatus for opening and closing a sliding armrest console may include having a console body, an opening and closing plate rotatably secured to an upper portion of the console body to thereby open and close an upper surface of the console body, and an armrest slid from the opening and closing plate, may include a hook provided to a front end portion of the opening and closing plate and controlling opening and closing of the opening and closing plate from the console body, and a locking unit provided to the armrest, controlling a sliding operation of the armrest by a rotation operation and operating the hook together with the controlling of the sliding operation of the armrest at the same time.

6 Claims, 6 Drawing Sheets

APPARATUS FOR OPENING AND CLOSING SLIDING ARMREST CONSOLE

CROSS REFERENCE TO RELATED APPLICATION

The present application claims priority to Korean Patent Application No. 10-2014-0082438 filed Jul. 2, 2014, the entire contents of which is incorporated herein for all purposes by this reference.

BACKGROUND OF THE INVENTION

1. Field of the Invention

The present invention relates to an apparatus for opening and closing a sliding armrest console, and more particularly, to an apparatus for opening and closing a sliding armrest console preventing an armrest in a sliding operated state from being arbitrarily released by a vibration during a drive in an opened state.

2. Description of Related Art

A console having an armrest structure which is installed between a driving seat and a passenger seat of a vehicle has a function that a passenger puts his/her arm thereon and is also used as a storage space.

Figure 1A:
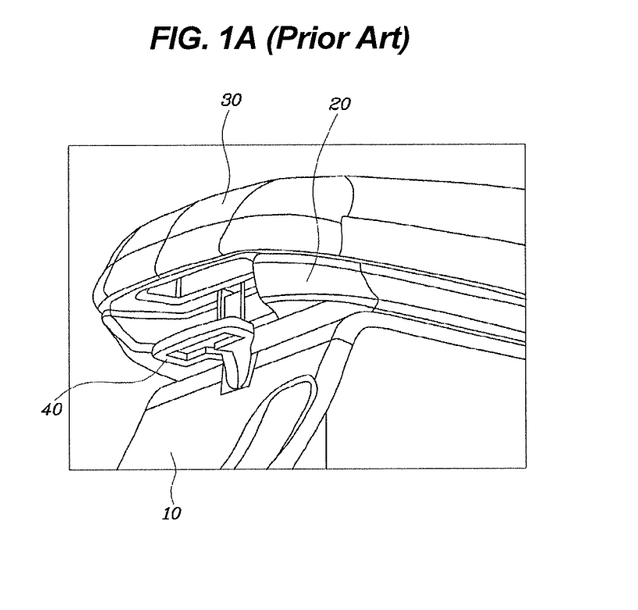
FIG. 1A and FIG. 1B are perspective views showing an armrest console of a general sliding scheme in the related art.
Figure 1B:
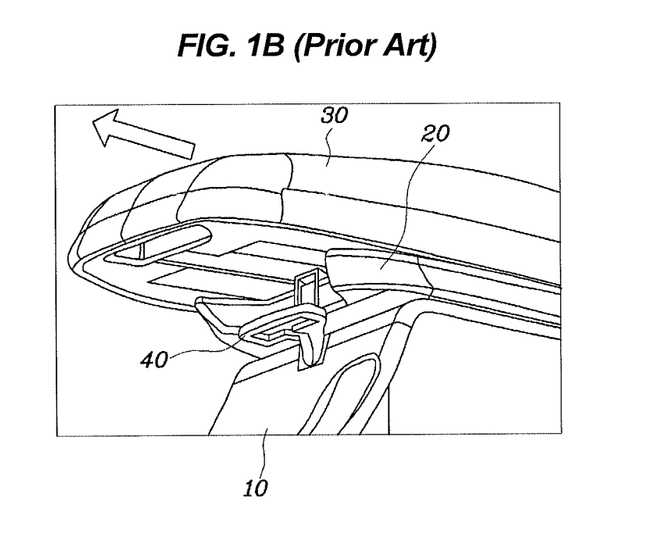
Figure 2:
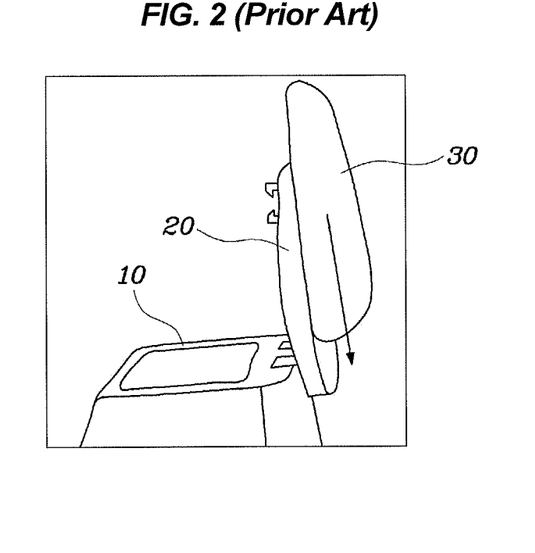
FIG. 2 is a view showing a problem occurring when the armrest console of the general sliding scheme is used in the related art.

FIGS. 1A and 1B are perspective views showing an armrest console of a general sliding scheme and FIG. 2 is a view showing a problem occurring when using the armrest console of the general sliding scheme.

As shown in FIGS. 1A and 1B, the armrest console of the general sliding scheme according to the related art has a structure including a console body 10, an opening and closing plate 20 rotated at an upper portion of the console body 10 to open and close an upper surface of the console body 10, and an armrest 30 slid from the opening and closing plate 20.

In this case, a front end portion of the opening and closing plate 20 is provided with a hook 40 provided so as to be rotated and controlling the opening and closing of the opening and closing plate 20 to the console body 10.

Therefore, while a handle unit extended from one side of the hook 40 is manipulated, the hook 40 is integrally rotated, a locking between the opening and closing plate 20 and the console body 10 is released, and the opening and closing plate 20 is rotated, such that an upper portion of the console body 10 may be opened.

Meanwhile, since the armrest 30 is provided so as to be slid from the opening and closing plate 20 by external force by a user, when the user wants to use the armrest 30, the user pulls and slides the armrest 30 in a front direction as shown in FIG. 1B. In this case, since the user does not operate the hook 40, the locking between the opening and closing plate 20 and the console body 10 is not released.

However, when the user wants to open the console body 10 in a state in which the armrest 30 is slid in the front direction, it is difficult for the user to manipulate the hook 40 due to the armrest 30 moved in the front direction. Therefore, the user should open the armrest 30 by first sliding the armrest 30 in a rear direction and then rotating the opening and closing plate 20.

However, in the case in which the user rotates and opens the opening and closing plate 20 by manipulating the hook 40 without completely sliding the armrest 30 in the rear direction, the opening and closing plate 20 stands erect in a vertical direction in a state in which the armrest 30 is opened, as shown in FIG. 2. As a result, the armrest 30 downwardly falls due to own weight and a vibration of a vehicle, such that noise may be generated or damage to the user may be caused.

The armrest console of the sliding scheme according to the related art as described above had the problem that it is difficult to manipulate the hook 40 in order to rotate the opening and closing plate 20 in the state in which the armrest 30 is slid in the front direction and the problem that the armrest 30 arbitrarily falls due to the own weight and the vibration of the vehicle once the opening and closing plate 20 is rotated in the state in which the armrest 30 is slid.

Therefore, a technology capable of rotating the opening and closing plate by manipulating the hook independently of a position of the armrest has been proposed and used. For example, in Korean Patent Laid-Open Publication No. 10-2005-0058574 entitled "Apparatus for Opening a Sliding Armrest Console", a technology capable of operating a locking unit independently of a position of the armrest by delivering operating force of a button unit to the locking unit using a cylinder pressure has been disclosed.

Therefore, the technology disclosed may rotate the opening and closing plate independently of the position of the armrest and may also prevent the armrest from being arbitrarily fallen by the cylinder pressure even though the opening and closing plate is rotated and stands erect in the vertical direction in the state in which the armrest is slid in the front direction.

However, since the button unit and the locking unit are connected through a cylinder, when the armrest is slid, the armrest should be slid by force stronger than an internal pressure of the cylinder. Therefore, it is very difficult to move the armrest and there was a limit in rapidly operating the armrest because the internal pressure of the cylinder acts as friction force to the movement of the armrest.

The information disclosed in this Background of the Invention section is only for enhancement of understanding of the general background of the invention and should not be taken as an acknowledgement or any form of suggestion that this information forms the prior art already known to a person skilled in the art

BRIEF SUMMARY

Various aspects of the present invention are directed to providing an apparatus for opening and closing a sliding armrest console capable of controlling a sliding operation of an armrest and a rotating operation of an opening and closing plate by one locking unit.

Various aspects of the present invention are particularly directed to providing an apparatus for opening and closing a sliding armrest console capable of being locked to the opening and closing plate by the locking unit even in a state in which the armrest is slid in a front direction to thereby prevent a locking state between the armrest and the opening and closing plate from being arbitrarily released.

According to various aspects of the present invention, an apparatus for opening and closing a sliding armrest console having a console body, an opening and closing plate rotatably secured to an upper portion of the console body to thereby open and close an upper surface of the console body, and an armrest slid from the opening and closing plate, may include a hook provided to a front end portion of the opening and closing plate and controlling opening and closing of the opening and closing plate from the console body, and a locking unit provided to the armrest, controlling a sliding operation of the armrest by a rotation operation and operating the hook together with the controlling of the sliding operation of the armrest at the same time.

The opening and closing plate may be lengthily provided with an inner rail in a sliding direction of the armrest, and the locking unit may include a guide rod integrally sliding the armrest while being slid along the inner rail, a cover rail fixing the guide rod to the armrest while surrounding a side portion and a lower portion of the guide rod and integrally sliding the armrest while being slid along the inner rail integrally with the guide rod, an inner rod having an intermediate region rotatably supported within the cover rail through an inner rod rotation shaft vertically rotating both ends of the inner rod and selectively locking one end of the inner rod to a front region and a rear region of the inner rail, and a knob rotatably installed in a front end portion of the cover rail to press and rotate one end of the hook and the inner rod by a rotation operation.

The hook may include a hook rotation shaft protruded to both sides of an intermediate region of the hook and rotatably installed in the opening and closing plate to have another end of the hook locked to the console body and the one end of the hook provided with a hook pressing unit pressed to the knob, and the knob may have a knob rotation shaft protruded to both sides of an intermediate region of the knob and rotatably installed in the cover rail to thereby have one end of the knob provided with a knob handle unit and another end of the knob provided with a hook pressing bar pressing the hook pressing unit and an inner rod pressing bar pressing another end of the inner rod.

The inner rod may include the inner rod rotation shaft protruded to both sides of the intermediate region of the inner rod and rotatably installed in the cover rail and catching protrusions protruded to both sides of the one end of the inner rod, and an upper end of the inner rail may be provided with a front locking groove and a rear locking groove in which the catching protrusions are selectively locked to the front region and the rear region of the inner rail, respectively.

A return spring may be disposed on between the inner rod rotation shaft and the catching protrusions on an upper surface of the inner rod, and the return spring may provide a restoring force maintaining a state in which the catching protrusions are locked to the front locking groove or the rear locking groove.

According to various aspects of the present invention, an apparatus for opening and closing a sliding armrest console including a console body, an opening and closing plate rotatably secured to an upper portion of the console body to thereby open and close an upper surface of the console body, and an armrest slid from the opening and closing plate, may include a hook provided to a front end portion of the opening and closing plate and controlling opening and closing of the opening and closing plate from the console body, and a locking unit provided to the armrest, controlling a sliding operation of the armrest by a rotation operation and operating the hook together with the controlling of the sliding operation of the armrest at the same time, in which the opening and closing plate may be lengthily provided with an inner rail in a sliding direction of the armrest, and the locking unit may include a guide rod integrally sliding the armrest while being slid along the inner rail, a cover rail fixing the guide rod to the armrest while surrounding a side portion and a lower portion of the guide rod and integrally sliding the armrest while being slid along the inner rail integrally with the guide rod, an inner rod having an intermediate region rotatably supported within the cover rail to thereby vertically rotate both ends thereof and selectively lock one end to a front region and a rear region of the inner rail, and a knob rotatably installed in a front end portion of the cover rail to press and rotate the other end of the hook and the inner rod by a rotation operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
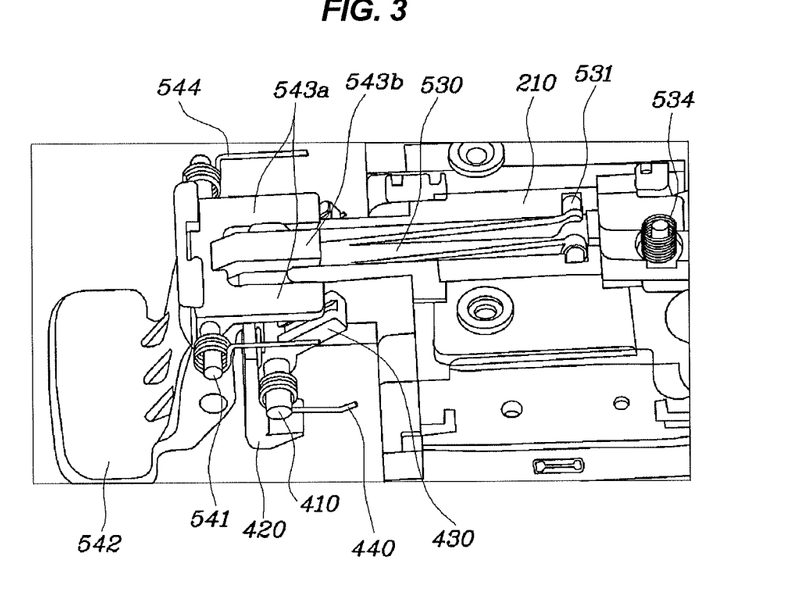
FIG. 3, FIG. 4 and FIG. 5 are perspective views showing an exemplary apparatus for opening and closing a sliding armrest console according to the present invention.
Figure 4:
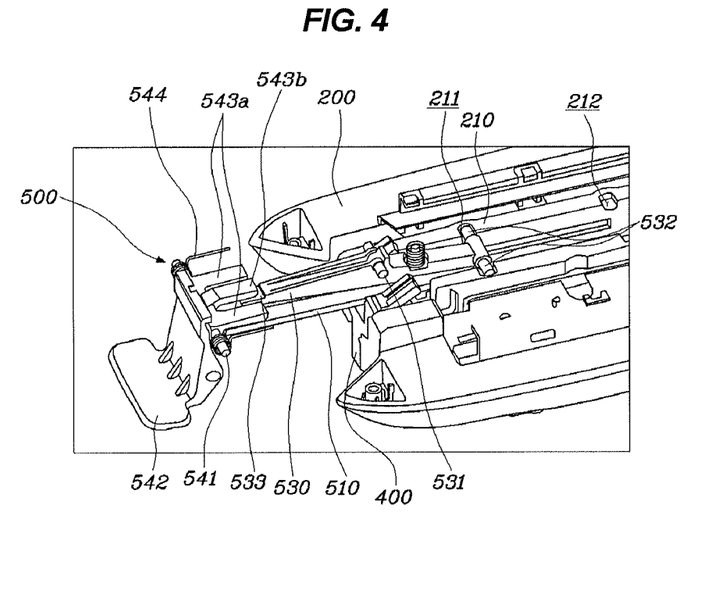
Figure 5:
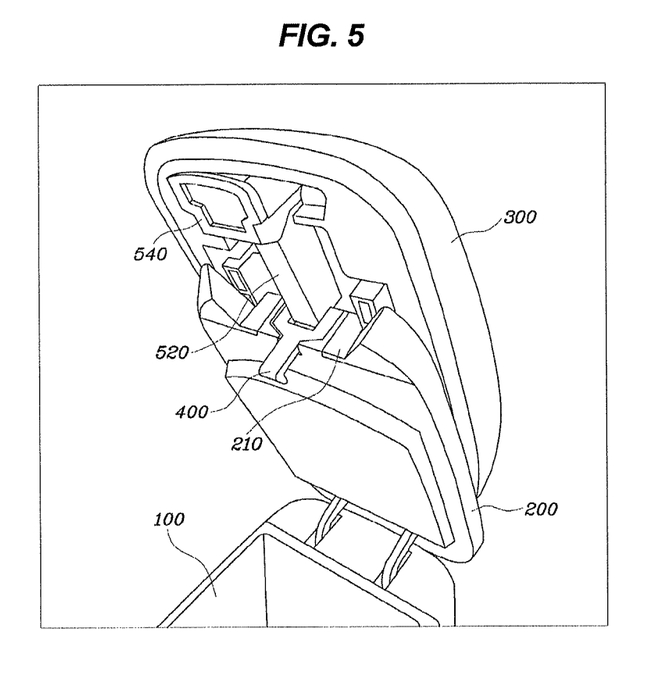

FIGS. 3 to 5 are perspective views showing an apparatus for opening and closing a sliding armrest console according to various embodiments of the present invention and FIGS. 6A, 6B, 7A, 7B, 8A and 8B are side views and plan views showing operating states of the apparatus for opening and closing the sliding armrest console according to various embodiments of the present invention.

Here, FIG. 3 is a perspective view in a state in which the armrest is positioned on an upper portion of the opening and closing plate, FIG. 4 is a perspective view in a state in which the armrest is slid in a front direction, and FIG. 5 is a perspective view in a state in which the opening and closing plate is rotated and the console body is opened in the state in which the armrest is slid in the front direction.

As shown in the drawings, the apparatus for opening and closing the sliding armrest console according to various embodiments of the present invention, which is an apparatus mounted in a console with a sliding armrest structure having a console body 100, an opening and closing plate 200 rotatably secured to an upper portion of the console body 100 to open and close an upper surface of the console body 100, and an armrest 300 slid from the opening and closing plate 200, is a unit performing a locking or a locking-releasing between the console body 100 and the opening and closing plate 200, and between the opening and closing plate 200 and the armrest 300. In this case, the opening and closing plate 200 is lengthily provided with an inner rail 210 in a sliding direction of the armrest 300.

The inner rail 210 is a unit in which a locking unit 500 to be described below is moved and guided together with a sliding operation of the armrest 300, is a structure having a cross section of approximately "U" shape, and is lengthily formed along the sliding direction of the armrest 300 to have a space lengthily formed therein in which the locking unit 500 is moved while an upper portion thereof is opened.

Meanwhile, the apparatus for opening and closing the sliding armrest console according to various embodiments of the present invention includes a hook 400 provided to a front end portion of the opening and closing plate 200 to control the opening and closing of the opening and closing plate 200 from the console body 100, and a locking unit 500 provided to the armrest 300 to control a sliding operation of the armrest 300 by a rotation operation and operate the hook 400 together with the control of the sliding operation of the armrest 300 at the same time.

The hook 400, which is a unit performing a locking or a locking-releasing between the opening and closing plate 200 and the console body 100, has a hook rotation shaft 410 protruded to both sides of an intermediate region of the body so that it may be installed in the front end portion of the opening and closing plate 200 and may be rotated. In this case, the hook rotation shaft 410 is provided with a first coil spring 440 providing elastic force for returning the hook 400 after being rotated.

Meanwhile, the hook 400 has one side end portion on which a hook unit 420 is formed so that one side end portion based on the hook rotation shaft 410 is locked to the console body 100 and another side end portion on which a hook pressing unit 430 is formed. Therefore, once the hook pressing unit 430 is pressed by a knob 540 to be described below, the hook 400 is rotated around the hook rotation shaft 410.

The locking unit 500, which is a unit controlling the sliding operation of the armrest 300 by the rotation operation and operating the hook 400 together with the control of the sliding operation of the armrest 300 at the same time, generally includes a guide rod 510, a cover rail 520, an inner rod 530, and a knob 540.

The guide rod 510, which is a unit sliding integrally the armrest 300 while being slid along the inner rail 210, is lengthily formed in the sliding direction of the armrest 300.

The cover rail 520 fixes the guide rod 510 to the armrest 300 while surrounding the guide rod 510 and slides integrally the armrest 300 while being slid along the inner rail 210 integrally with the guide rod 510.

The inner rod 530, which is a unit selectively maintaining a locking state or a locking-releasing state between the armrest 300 and the opening and closing plate 200 when the armrest 300 is slid, is lengthily formed in the sliding direction of the armrest 300. In this case, the inner rod 530 is disposed on an upper portion of the guide rod 510 within the cover rail 520. Particularly, the inner rod 530 has an inner rod rotation shaft 531 protruded to both sides so that an intermediate region thereof is rotatably supported within the cover rail 520, wherein both sides are vertically rotated based on the inner rod rotation shaft 531. Therefore, one side end portion of the inner rod 530 has catching protrusions 532 which are protrudedly formed at both sides thereof to perform the locking with the inner rail 210 and the other side end portion has an inner rod pressing unit 533 formed thereon.

Therefore, an upper end of the inner rail 210 is provided with a front locking groove 211 and a rear locking groove 212 in which the catching protrusions 532 are selectively locked to a front region and a rear region, respectively. A position at which the front locking groove 211 is formed is a position at which the catching protrusions 532 of the inner rod 530 are disposed in a state in which the armrest 300 is completely slid in a front direction, and a position at which the rear locking groove 212 is formed is a position at which the catching protrusions 532 of the inner rod 530 are disposed in a state in which the armrest 300 is completely slid in a rear direction.

In addition, on the upper surface of the inner rod 530, a return spring 534 is disposed at a position between the inner rod rotation shaft 531 and the catching protrusions 532. Therefore, as the return spring 534 is disposed between the inner rod 530 and the cover rail 520 or between the inner rod 530 and the armrest 300, force is provided to maintain a state in which the catching protrusions 532 are locked to the front locking groove 211 or the rear locking groove 212 by restoring force of the return spring 534.

Meanwhile, the knob 540 is a unit controlling the rotation operation of the hook 400 and the inner rod 530, and is rotatably installed on the front end portion of the cover rail 520.

To this end, an intermediate region of a body of the knob 540 has a knob rotation shaft 541 protruded to both sides thereof. In this case, the knob rotation shaft 541 is provided with a second coil spring 544 providing elastic force for returning the knob 540 after being rotated.

In addition, the knob 540 has a knob handle unit 542 formed on one side end portion based on the knob rotation shaft 541, and a hook pressing bar 543*a* pressing the hook pressing unit 430 of the hook 400 and an inner rod pressing bar 543*b* pressing the inner rod pressing unit 533 of the inner rod 530 formed on the other side end portion.

In this case, the hook pressing bar 543*a* and the inner rod pressing bar 543*b* may have arrangements variously changed according to arrangement of the hook 400 and the inner rod 530. For example, according to various embodiments of the present invention, a pair of hook pressing units 430 of the hook 400 are each provided to be spaced apart from each other, and the inner rod 530 passes through between the pair of hook pressing units 430. Therefore, a pair of hook pressing bars 543*a* is formed at the other end of the knob 540 to be spaced apart from each other and the inner rod pressing bar 543*b* is formed between the pair of hook pressing bars 543*a*. Therefore, as shown in the drawings, the pair of hook pressing bars 543*a* and the inner rod pressing bar 543*b* are configured in a shape such as a fork.

An operating state of the apparatus for opening and closing the sliding armrest console according to various embodiments of the present invention configured as described above will be described with reference to the drawings.

Figure 6A:
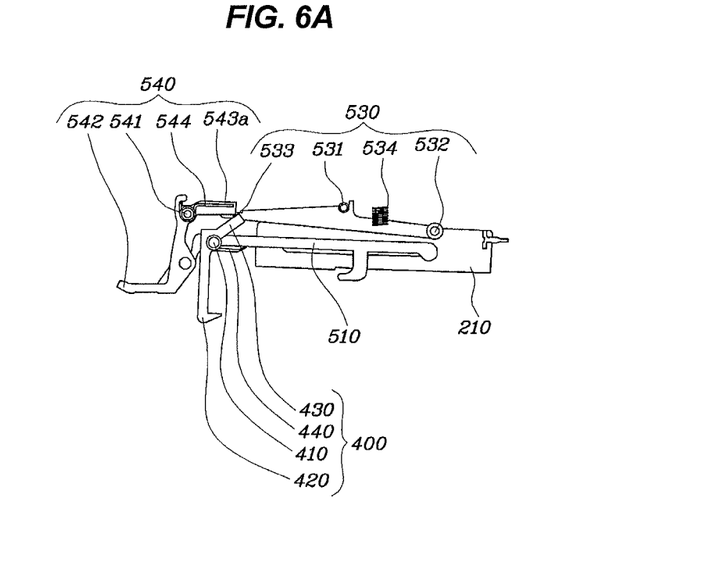
FIG. 6A, FIG. 6B, FIG. 7A, FIG. 7B, FIG. 8A and FIG. 8B are side views and plan views showing operating states of the exemplary apparatus for opening and closing the sliding armrest console according to the present invention.
Figure 6B:
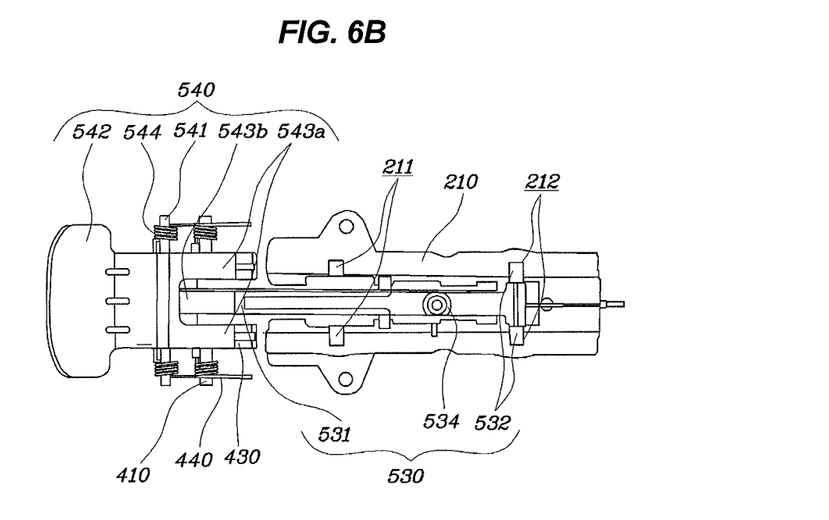

FIGS. 6A and 6B show a side view and a plan view in a state in which the opening and closing plate is closed and a state in which the armrest is positioned at the upper portion of the opening and closing plate.

In this case, the opening and closing plate 200 closes the upper portion of the console body 100 and the armrest 300 is disposed on the upper portion of the opening and closing plate 200. In this state, all of the knob 540, the hook 400, and the inner rod 530 are maintained in place.

The hook unit 420 of the hook 400 is maintained in a state locked to the console body 100 and the catching protrusions 532 of the inner rod 530 are maintained in a state locked to the rear locking groove 212 of the inner rail 210.

In this state, in order for the user to rotate the opening and closing plate 200 or slide the armrest 300 in the front direction, the user operates the knob 540 to thereby release the locking state of the hook 400 and the inner rod 530.

Figure 7A:
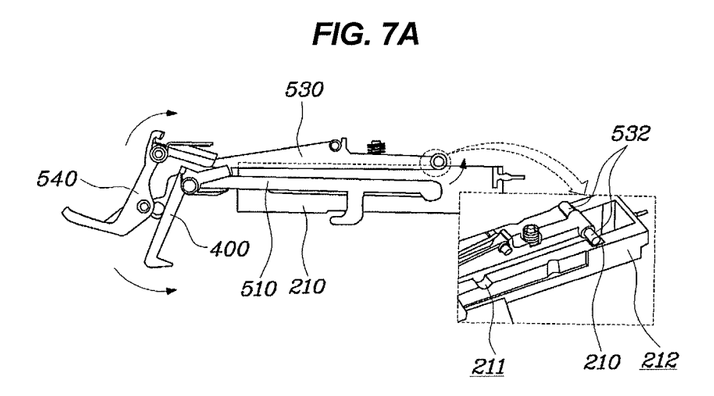
Figure 7B:
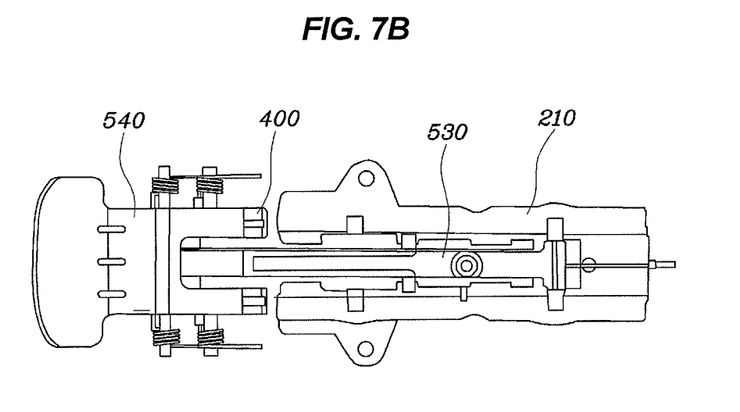

FIGS. 7A and 7B show a side view and a plan view in a state in which the locking state of the hook and the inner rod is released by the operation of the knob.

When the user holds the knob handle unit 542 of the knob 540 and applies force to rotate the knob handle unit 542 in an upper direction based on the knob rotation shaft 541, the hook pressing bar 543a and the inner rod pressing bar 543b formed on the knob 540 are rotated in a lower direction.

As a result, the hook pressing bar 543a presses the hook pressing unit 430 of the hook 400 while being rotated, and accordingly, the hook 400 is rotated around the hook rotation shaft 410 and the hook unit 420 is locking-released from the console body 100.

In addition, the inner rod pressing bar 543b presses the inner rod pressing unit 533 of the inner rod 530 while being rotated, and accordingly, the inner rod 530 is rotated around the inner rod rotation shaft 531 and the catching protrusions 532 are locking-released from the rear locking groove 212 of the inner rail 210.

As such, once the hook 400 and the inner rail 210 are locking-released from the console body 100 and the inner rail 210, respectively, the opening and closing plate 200 may be rotated in the upper direction by the force of the user to thereby open the upper portion of the console body 100 and to slide the armrest 300 in the front direction by the force of the user at the same time.

Figure 8A:
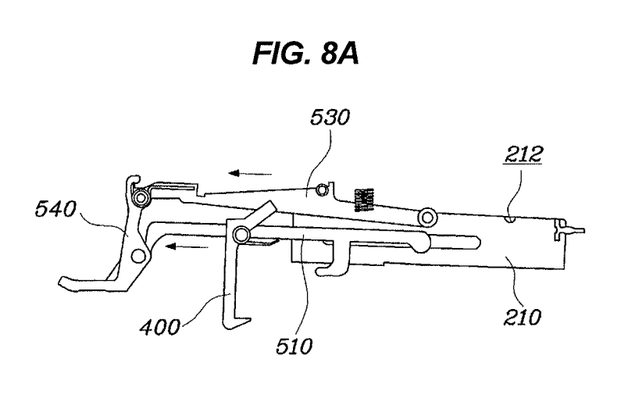
Figure 8B:
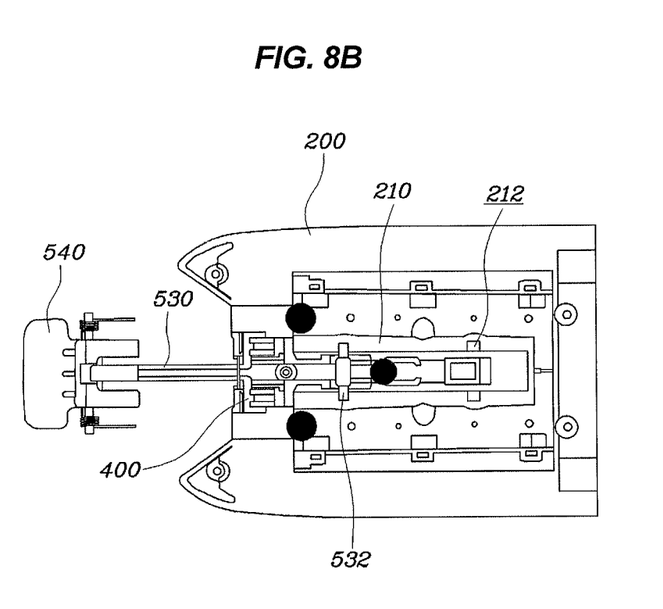

FIGS. 8A and 8B show a side view and a plan view in a state in which the armrest is slid in the front direction.

Once the user slides the armrest 300 in the front direction, the knob 540, the cover rail 520, the guide rod 510, and the inner rod 530 are moved in the front direction integrally with the sliding of the armrest 300.

Once the sliding of the armrest 300 is completed, the user removes the force applied to the knob 540. Then, while the knob handle unit 542 of the knob 540 is rotated in the lower direction by the elastic force of the second coil spring 544 installed in the knob rotation shaft 541, the hook pressing bar 543a and the inner rod pressing bar 543b are rotated in the upper direction. Then, while the state in which the inner rod pressing bar 543b presses the inner rod pressing unit 533 of the inner rod 530 is released, the inner rod 530 is rotated in a lower direction of the catching protrusions 532 by the elastic force of the return spring 534 and inserted into the front locking groove 211 of the inner rail 210, thereby maintaining the locking state. As such, as the locking state between the inner rod 530 and the inner rail 210 is maintained by the elastic force of the return spring 534, the locking state of the armrest 300 may be maintained without being released by the external force.

According to various embodiments of the present invention, since the position of the armrest after being slid may be selectively locked by the locking unit, it is possible to prevent the position of the armrest from being arbitrarily changed due to the own weight of the armrest and the vibration of the vehicle in the state in which the user does not want. Therefore, it is possible to prevent the armrest from being arbitrarily fallen even though the armrest stands erect in the vertical direction by the rotation of the opening and closing plate in the state in which the armrest is slid in the front direction.

In addition, the locking between the armrest and the opening and closing plate and the locking between the opening and closing plate and the console body are simultaneously released by one manipulation of the locking unit, such that the user may quickly perform the sliding operation of the armrest and the rotation operation of the opening and closing plate.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for opening and closing a sliding armrest console including a console body, an opening and closing plate rotatably secured to an upper portion of the console body to thereby open and close an upper surface of the console body, and an armrest slid from the opening and closing plate, the apparatus comprising:
   a hook provided to a front end portion of the opening and closing plate and controlling opening and closing of the opening and closing plate from the console body; and
   a locking unit provided to the armrest, controlling a sliding operation of the armrest by a rotation operation and operating the hook together with the controlling of the sliding operation of the armrest at the same time,
   wherein the locking unit includes:
      a guide rod integrally sliding the armrest while being slid along the opening and closing plate; and
      an inner rod controlling the sliding operation of the armrest while being slid integrally with the guide rod.

2. The apparatus according to claim 1, wherein the opening and closing plate is lengthily provided with an inner rail in a sliding direction of the armrest, and the locking unit further includes:
   a cover rail fixing the guide rod to the armrest while surrounding a side portion and a lower portion of the guide rod and integrally sliding the armrest while being slid along the inner rail integrally with the guide rod; and
   the inner rod having an intermediate region rotatably supported within the cover rail to vertically rotate both ends of the inner rod and selectively locking one end of the inner rod to a front region and a rear region of the inner rail; and
   a knob rotatably installed in a front end portion of the cover rail to press and rotate one end of the hook and the inner rod by a rotation operation.

3. The apparatus according to claim 2, wherein the hook includes a hook rotation shaft protruded to both sides of an intermediate region of the hook and rotatably installed in the opening and closing plate to have another end of the hook locked to the console body and the one end of the hook provided with a hook pressing unit pressed to the knob, and the knob has a knob rotation shaft protruded to both sides of an intermediate region of the knob and rotatably installed in the cover rail to have one end of the knob provided with a knob handle unit and another end of the knob provided with a hook pressing bar pressing the hook pressing unit and an inner rod pressing bar pressing another end of the inner rod.

4. The apparatus according to claim 2, wherein the inner rod includes the inner rod rotation shaft protruded to both sides of the intermediate region of the inner rod and rotatably installed in the cover rail and catching protrusions protruded to both sides of the one end of the inner rod, and an upper end of the inner rail is provided with a front locking groove and a rear locking groove in which the catching protrusions are selectively locked to the front region and the rear region of the inner rail, respectively.

5. The apparatus according to claim 4, wherein a return spring is disposed between the inner rod rotation shaft and the catching protrusions on an upper surface of the inner rod, and the return spring provides restoring force maintaining a state in which the catching protrusions are locked to the front locking groove or the rear locking groove.

6. An apparatus for opening and closing a sliding armrest console including a console body, an opening and closing plate rotatably secured to an upper portion of the console body to thereby open and close an upper surface of the console body, and an armrest slid from the opening and closing plate, the apparatus comprising:

a hook provided to a front end portion of the opening and closing plate and controlling opening and closing of the opening and closing plate from the console body; and a locking unit provided to the armrest, controlling a sliding operation of the armrest by a rotation operation and operating the hook together with the controlling of the sliding operation of the armrest at the same time, wherein the opening and closing plate is lengthily provided with an inner rail in a sliding direction of the armrest, and wherein the locking unit includes:

a guide rod integrally sliding the armrest while being slid along the inner rail;

a cover rail fixing the guide rod to the armrest while surrounding a side portion and a lower portion of the guide rod and integrally sliding the armrest while being slid along the inner rail integrally with the guide rod;

an inner rod having an intermediate region rotatably supported within the cover rail to thereby vertically rotate both ends thereof and selectively lock one end to a front region and a rear region of the inner rail; and a knob rotatably installed in a front end portion of the cover rail to press and rotate one end of the hook and the inner rod by a rotation operation.

\* \* \* \* \*